(12) United States Patent
Patel et al.

(10) Patent No.: US 7,181,765 B2
(45) Date of Patent: Feb. 20, 2007

(54) METHOD AND APPARATUS FOR PROVIDING NODE SECURITY IN A ROUTER OF A PACKET NETWORK

(75) Inventors: Vijaykumar M. Patel, Fairfax, VA (US); Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 861 days.

(21) Appl. No.: 09/976,516

(22) Filed: Oct. 12, 2001

(65) Prior Publication Data

US 2003/0074582 A1    Apr. 17, 2003

(51) Int. Cl.
*G06F 9/00* (2006.01)
*G06F 15/173* (2006.01)
*H04L 9/00* (2006.01)

(52) U.S. Cl. .................. 726/12; 709/224; 713/153; 726/13

(58) Field of Classification Search ................ 713/153, 713/201, 183, 188; 709/225, 224, 220; 726/23
See application file for complete search history.

(56) References Cited

U.S. PATENT DOCUMENTS

| | | | |
|---|---|---|---|
| 5,414,833 A | 5/1995 | Hershey et al. ............. 395/575 |
| 5,440,723 A * | 8/1995 | Arnold et al. .................. 714/2 |
| 5,557,742 A | 9/1996 | Smaha et al. ............... 395/186 |
| 5,991,881 A | 11/1999 | Conklin et al. ............. 713/201 |
| 6,519,703 B1 * | 2/2003 | Joyce .......................... 713/201 |
| 6,789,202 B1 * | 9/2004 | Ko et al. ..................... 713/201 |
| 6,895,432 B2 * | 5/2005 | Ando et al. .................. 709/220 |
| 6,944,673 B2 * | 9/2005 | Malan et al. ................ 709/237 |
| 2001/0039579 A1 * | 11/2001 | Trcka et al. ................. 709/224 |

* cited by examiner

*Primary Examiner*—Nasser Moazzami
*Assistant Examiner*—Pramila Parthasarathy
(74) *Attorney, Agent, or Firm*—Charles W. Bethards

(57) ABSTRACT

A router (200) monitors (302) a data packet sent from an originator (102) via the router and addressed to a destination device (112, 116) other than the router, and determines (304) whether the data packet is potentially harmful to the destination device. The router interrupts (306) transmission of the data packet in response to determining that the data packet is potentially harmful to the destination device, including communicating (307) with a second router to cause the second router to interrupt transmission of a future data packet; and transmits (308) the data packet in response to determining that the data packet is not potentially harmful to the destination device.

18 Claims, 1 Drawing Sheet

METHOD AND APPARATUS FOR PROVIDING NODE SECURITY IN A ROUTER OF A PACKET NETWORK

FIELD OF THE INVENTION

This invention relates in general to data communication systems, and more specifically to a method and apparatus for providing node security in a router of a packet data network.

BACKGROUND OF THE INVENTION

Packet data communication networks that are accessible to the public are subject to intrusion and disruption by predatory elements, such as hackers. By targeting a few critical nodes with a destructive virus or worm, it is possible to take down an entire network. Prior-art routers have done little more than reading header information and forwarding each data packet to the destination indicated in the associated header. This has provided no protection to destination devices, including computers and other routers that might be harmed by the user data carried by the data packet.

Thus, what is needed is a method and apparatus for providing node security in a router of a packet network. Preferably, the method and apparatus will be able to detect and eliminate potentially harmful data packets soon after they enter the network, and before they can reach destinations where they can produce widespread harm.

DETAILED DESCRIPTION OF THE DRAWINGS

Figure 1:
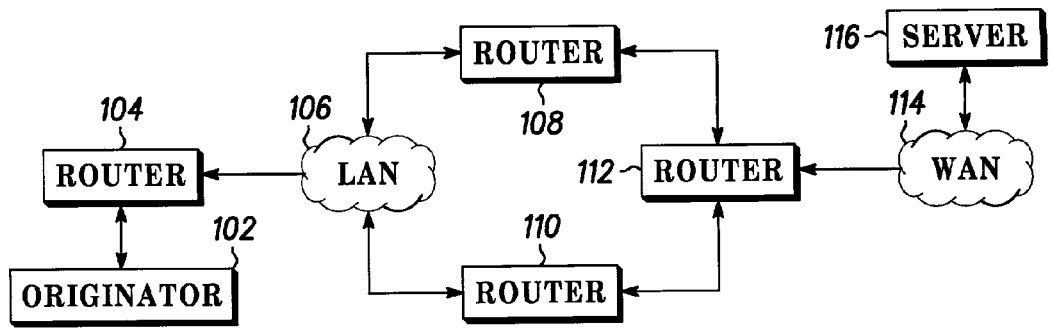
FIG. 1 is an electrical block diagram of an exemplary packet data communication network in accordance with the present invention.

Referring to FIG. 1, an electrical block diagram 100 of an exemplary packet data communication network in accordance with the present invention comprises an originator 102 that transmits data packets through the network. The originator can employ, for example, a workstation, a personal computer, or a portable or wireless multimedia device to transmit the data packets. The network can comprise an entry router 104 and various combinations of wired or wireless local area networks (LAN) 106, intermediate routers 108, 110, 112, a wide area network (WAN) 114, and one or more servers 116. A typical destination of the data packets is, for example, the server 116. When the originator has malicious intent and wishes to harm all or part of the network, the destination can be either the server 116 or one or more of the routers 104, 108, 110, 112.

One aspect of the present invention is to involve the routers of the network more effectively than has been done in the prior art, in order to detect and intercept harmful data packets, such as viruses, worms, and Trojan horses at the earliest possible point after entry into the network and before much of the network can become infected. Another and related aspect provides a "healing" methodology for the network or components within the network. For example, when the originator 102 is attempting to send harmful data packets into the network, the entry router 104 is the preferred choice for blocking the harmful data packets. In one embodiment, one or more of the downstream routers, e.g., the router 112, can be designated an "enhanced security" router, in that it can be programmed with more sophisticated detection mechanisms for locating harmful data packets than the upstream routers, and it would then collaborate with the upstream routers to coordinate and control the efforts to eradicate the harmful data packets thus facilitating the above mentioned healing effect. This would allow some economic trade-offs to be made. Various techniques will be described further herein below for providing the collaboration among the routers of the network in accordance with the present invention to successfully detect and intercept harmful data packets near and over time even nearer their entry point.

Figure 2:
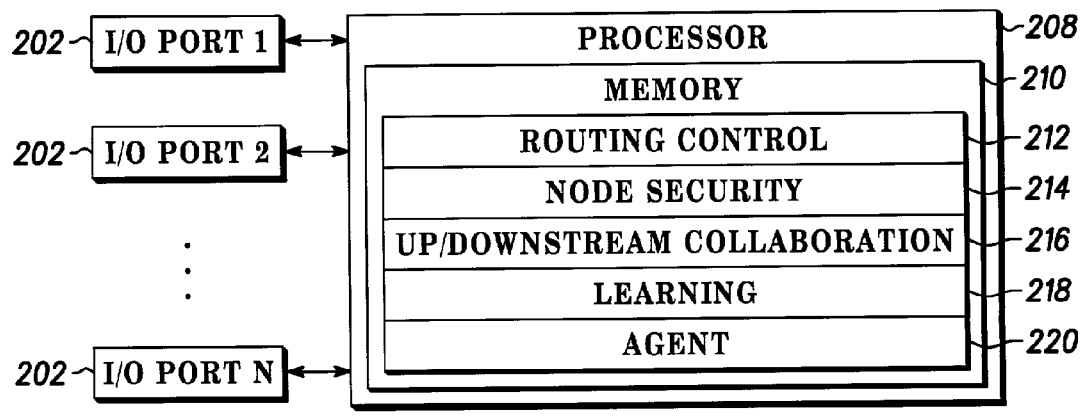
FIG. 2 is an electrical block diagram of an exemplary router in accordance with the present invention.

Referring to FIG. 2, an electrical block diagram of an exemplary router 200 in accordance with the present invention comprises a plurality of input/output (I/O) ports (1-N) 202 for communicating with other nodes of a network. More specifically, the I/O ports are for accepting a data packet sent from an originator via the router 200 and addressed to a destination device other than the router 200, and for transmitting the data packet to the destination device. The I/O ports 202 are coupled to a processor 208 for processing the data packet in accordance with the present invention.

The processor 208 preferably comprises a memory 210 containing software and operating parameters for programming the processor 208. The memory 210 comprises a routing control program and database 212 for controlling the routing of data packets through well-known techniques. It will be appreciated that, for additional speed, the router 200 also can comprise special purpose hardware for routing the bulk of the data packets. The memory 210 also includes a node security program 214 for programming the processor 208 in accordance with the present invention. The node security program 214 programs the processor 208 to monitor selected data packets as they enter the router 200, and to determine, on the fly or in near real-time, whether the data packets are potentially harmful to the destination device (or, alternatively, to the router 200 itself). The monitoring preferably begins with scrutinizing the nature of the control headers of the data packets for corruption.

Depending on the traffic the router 200 is handling, as well as a history of recently encountered harmful data packets, the monitoring can be done in several different manners. These include: random sampling of a subset of data packets; monitoring data packets having a predetermined source address; monitoring data packets having a predetermined destination address; or monitoring data packets having a predetermined combination of source and destination address. It will be appreciated that selection of the data packets to be monitored can also take into account the port numbers used by the source or the destination. Advantageously, random sampling of data packets reduces the processing burden on the router, and the sampling rate can be adjusted according to traffic and the frequency of attacks. Address-specific monitoring advantageously allows focusing on known suspicious originators and/or targeted destinations.

The node security program 214 further programs the processor 208 to interrupt transmission of the data packet in response to determining that the data packet is potentially harmful to the destination device, including communicating with a second router to cause the second router to interrupt transmission of a future data packet; and to transmit the data packet in response to determining that the data packet is not potentially harmful to the destination device. Once the decision has been made to interrupt the transmission of the data packet, the processor 208 can also be programmed to interrupt or discard later sent data packets from the same originator.

There are several techniques that the node security program 214 uses to detect harmful data packets. One known technique is to check for signatures or data patterns that can indicate the potential presence of known viruses, worms, Trojan horses, and the like. Also, because a definitive determination often is impossible after examining only a single data packet, when the processor 208 determines that a first data packet is suspicious, e.g., the data packet resembles something harmful but additional data packets are required to confirm, the processor 208 preferably decides to monitor future data packets having at least one of the source address and the destination address of the first data packet, until a definitive determination can be made. In addition, the processor 208 preferably examines the headers of data packets, looking for corruption and/or the presence of executable code as is known, particularly when such corruption and/or code originates from a single source. In addition, user data in the data packets can be analyzed by known methods to determine whether it contains executable code. Diagnostic software also can be executed to check whether doubtful or sample-picked hardware or software in the network have been tampered with.

The memory 210 also includes an up/downstream collaboration program 216 for programming the processor 208 to collaborate with other routers to block harmful data packets. The processor can, for example, send, using known techniques, a command addressed to the originator of harmful data, requesting address information for the routers participating in the handling of the command. Examples are the IP Ping and IP Traceroute commands. From the response, the processor 208 can learn the address of at least one upstream router that could have been used by the originator as the entry point to the network. The processor 208 then preferably collaborates with the at least one upstream router to intercept transmissions of the originator. This can be accomplished through a variety of techniques. For example, the processor 208 can send a command to the upstream router to intercept future data packets from the originator. Alternatively, the processor 208 can forward an agent (e.g., the agent 220) to the upstream router, where the agent is arranged to intercept a future data packet from the originator, through known techniques. Another option is for the processor to cause the upstream router to update its capabilities (e.g., virus database) to detect a potentially harmful data packet. It should also be appreciated that the upstream router need not be a neighbor of the requesting router in order to have the upstream router block transmissions from the originator. That is, the upstream router can be remotely connected to the requesting router through other routers, LANs, and WANs.

In addition, the memory 210 includes a learning program 218 for programming the processor 208 to learn about, through known techniques, e.g., from adulterated headers and suspicious user data, new harmful signatures to screen for. The new harmful signatures preferably are then communicated to upstream collaborating routers in the network. This advantageously can result in a dynamic, iterative, detect/warn/contain process for intercepting harmful data packets that provides a network healing effect. It is thus to be understood that the method and apparatus in accordance with the present invention advantageously provides a simple and effective way to intercept harmful data packets at or very near their entry point into the network.

Figure 3:
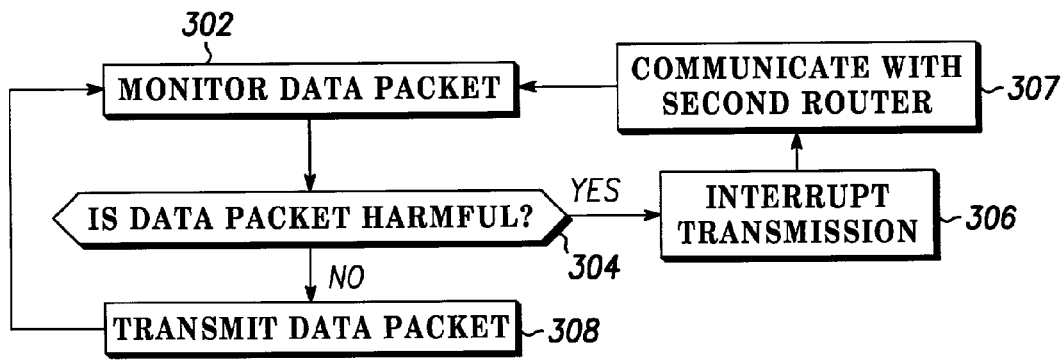
FIG. 3 is a flow chart depicting operation of the exemplary router in accordance with the present invention.

Referring to FIG. 3, a flow chart 300 depicts operation of the exemplary router 200 in accordance with the present invention. Flow begins with the router 200 monitoring 302 a selected data packet as described above. The router 200 then determines 304 whether the data packet is harmful, using at least one of the techniques outlined above. If so, the router 200 interrupts 306 the transmission of the data packet, and communicates 307 with at least a second router to cause the second router to interrupt a future data packet, as disclosed herein above. If, on the other hand, at step 304 the router 200 determines that the data packet is not harmful, the router 200 then transmits 308 the data packet towards the intended destination. It should be clear from the preceding disclosure that the present invention makes available a method and apparatus for providing node security in a router of a packet network. Advantageously, the method and apparatus is able to detect and eliminate potentially harmful data packets soon after they enter the network, and before they can reach destinations where they can produce widespread harm. This provides the healing effect for the network in the event harmful data is allowed to enter.

Many modifications and variations of the present invention are possible in light of the above teachings. Thus, it is to be understood that, within the scope of the appended claims, the invention can be practiced other than as described herein above.

The invention claimed is:

1. A method for providing node security in a router of a packet network, comprising the steps of:
   monitoring a data packet sent from an originator via the router and addressed to a destination device other than the router;
   determining in the router whether the data packet is potentially harmful to the destination device;
   interrupting transmission of the data packet in response to determining that the data packet is potentially harmful to the destination device, the interrupting further comprising the step of communicating with a second router to cause the second router to interrupt transmission of a future data packet; and
   transmitting the data packet in response to determining that the data packet is not potentially harmful to the destination device, wherein the interrupting step comprises the step of collaborating with an upstream router that is not a neighbor of the router to have the upstream router block transmissions from the originator.

2. The method of claim 1, wherein the interrupting step comprises the step of discarding a later data packet from the originator.

3. The method of claim 1, wherein the interrupting step comprises the step of sending a command to an upstream router to intercept future data packets from the originator.

4. The method of claim 1, wherein the interrupting step comprises the step of forwarding an agent to an upstream router, the agent arranged to intercept future data packets from the originator.

5. The method of claim 1, wherein the determining step comprises the step of checking for a potential presence of at least one of a worm, a virus, and a Trojan horse.

6. The method of claim 1, wherein the monitoring step comprises at least one of the steps of:
   random sampling of a subset of data packets;
   monitoring data packets having a predetermined source address;
   monitoring data packets having a predetermined destination address; and monitoring data packets having a predetermined combination of source and destination address.

7. The method of claim 1, wherein the determining step comprises the steps of:
   determining that a first data packet is suspicious; and
   in response to determining that the first data packet is suspicious, deciding to monitor future data packets having at least one of a source address and a destination address matching, respectively, the source address and the destination address of the first data packet.

8. The method of claim 1, wherein the interrupting step comprises the step of collaborating with an upstream router to cause the upstream router to update its capabilities to detect a potentially harmful data packet.

9. The method of claim of 1, wherein the interrupting step further comprises the step of identifying the upstream router by sending a command to the originator, the command requesting address information from participating routers.

10. A router for providing node security in a packet network, comprising:
    a plurality of I/O ports for accepting a data packet sent from an originator via the router and addressed to a destination device other than the router, and for transmitting the data packet to the destination device; and
    a processor coupled to the plurality of I/O ports for processing the data packet;
    wherein the processor is programmed to:
    monitor the data packet;
    determine whether the data packet is potentially harmful to the destination device;
    interrupt transmission of the data packet in response to determining that the data packet is potentially harmful to the destination device, including communicating with a second router to cause the second router to interrupt transmission of a future data packet; and
    transmit the data packet in response to determining that the data packet is not potentially harmful to the destination device,
    wherein the processor is further programmed to collaborate with an upstream router that is not a neighbor of the router to have the upstream router block transmissions from the originator.

11. The router of claim 10, wherein, in response to determining that the data packet is potentially harmful to the destination device, the processor is further programmed to discard a later data packet from the originator.

12. The router of claim 10, wherein, in response to determining that the data packet is potentially harmful to the destination device, the processor is further programmed to send a command to the upstream router to intercept future data packets from the originator.

13. The router of claim 10, wherein, in response to determining that the data packet is potentially harmful to the destination device, the processor is further programmed to forward an agent to the upstream router, the agent arranged to intercept future data packets from the originator.

14. The router of claim 10, wherein the processor is further programmed to check for a potential presence of at least one of a worm, a virus, and a Trojan horse.

15. The router of claim 10, wherein the processor is further programmed to at least one of:
    random sample a subset of data packets;
    monitor data packets having a predetermined source address;
    monitor data packets having a predetermined destination address; and
    monitor data packets having a predetermined combination of source and destination address.

16. The router of claim 10, wherein the processor is further programmed, in response to determining that a first data packet is suspicious, to decide to monitor future data packets having at least one of a source address and a destination address matching, respectively, the source address and the destination address of the first data packet.

17. The router of claim 10, wherein the processor is further programmed to collaborate with the upstream router to cause the upstream router to update its capabilities to detect a potentially harmful data packet.

18. The router of claim 10, wherein the processor is further programmed to identify the upstream router by sending a command to the originator, the command requesting address information from participating routers.

* * * * *

UNITED STATES PATENT AND TRADEMARK OFFICE
CERTIFICATE OF CORRECTION

PATENT NO.       : 7,181,765 B2                                    Page 1 of 1
APPLICATION NO.  : 09/976516
DATED            : February 20, 2007
INVENTOR(S)      : Patel et al.

It is certified that error appears in the above-identified patent and that said Letters Patent is hereby corrected as shown below:

In column 4 at line 52, please delete "an" and insert --the--.
In column 4 at line 55, please delete "an" and insert --the--.
In column 5 at line 12, please delete "an" and insert --the--.

Signed and Sealed this

Fourth Day of March, 2008

JON W. DUDAS
*Director of the United States Patent and Trademark Office*